May 11, 1943.  C. B. STRAUCH  2,318,901
PNEUMATIC PROTECTOR FOR AUTOMOBILES
Filed April 4, 1940  2 Sheets-Sheet 2
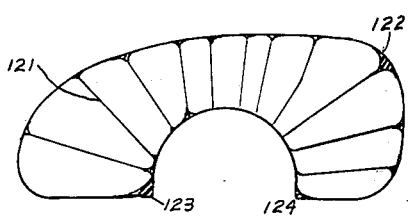
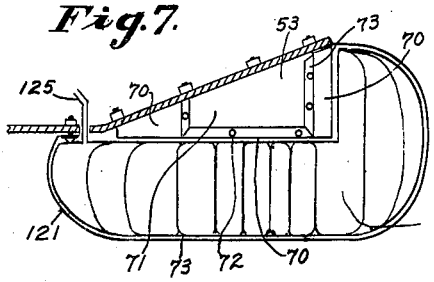
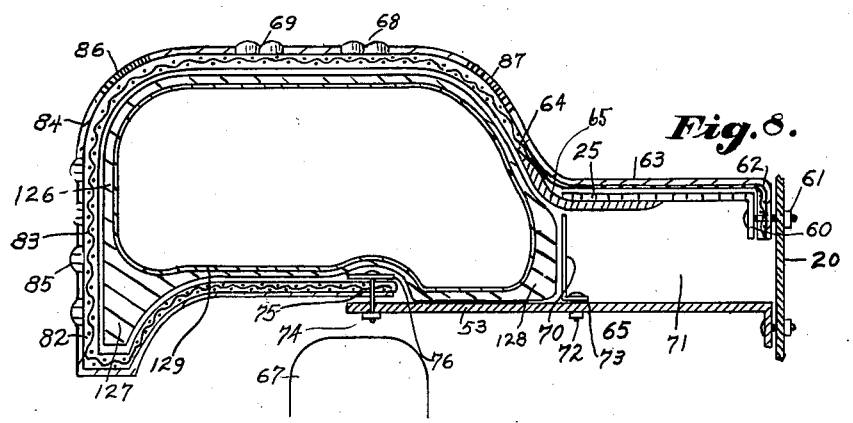
INVENTOR.
Clauss Burkart Strauch Patented May 11, 1943

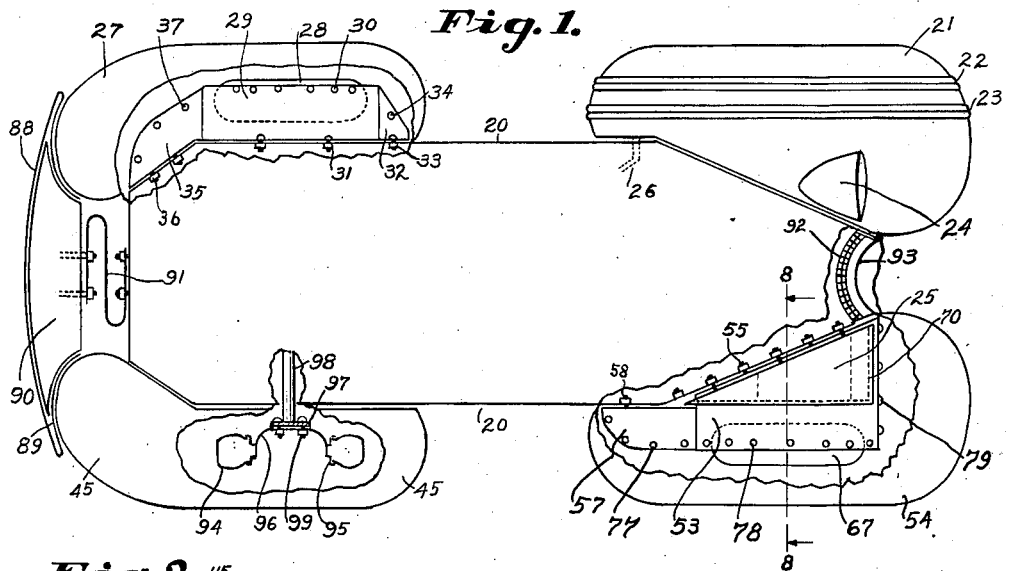
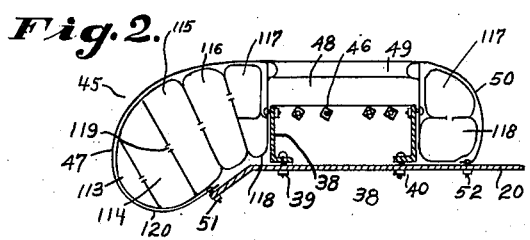
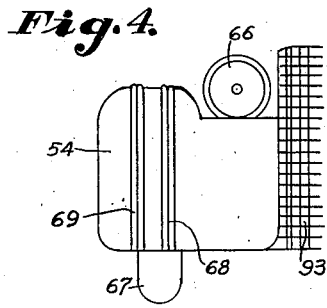
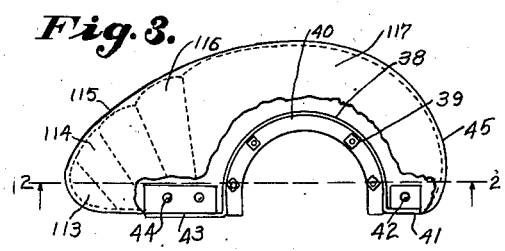
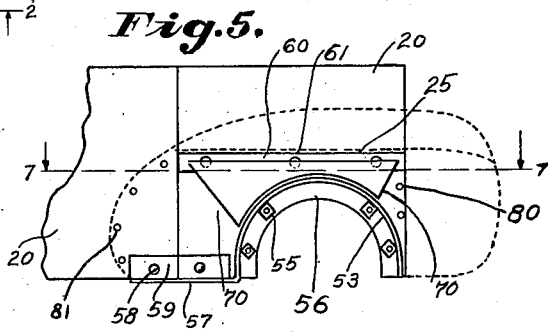

2,318,901

UNITED STATES PATENT OFFICE 2,318,901

PNEUMATIC PROTECTOR FOR AUTOMOBILES

Clauss Burkart Strauch, Hazel Green, Wis.

Application April 4, 1940, Serial No. 327,831

4 Claims. (Cl. 280—152)

This invention relates to improvements in the construction of pneumatic fenders of automobiles adapted to lessen the dangers of automobile accidents.

This case is a continuation-in-part of my copending applications Serial #260,672, filed March 9, 1939, now U. S. Patent #2,218,690 issued October 22, 1940, Serial #297,545, filed October 2, 1939, and Serial #309,990, filed December 19, 1939.

Heretofore, automobiles have been provided with fenders, constructed merely for streamlining and decorative purposes and against the dirt thrown from the wheels. They consist of thin walled, decorated metal bodies, lately of large dimensions, which are easily marred and crushed by any impact, leading to repeated and costly repairs, without offering any protection in collisions.

Pneumatic fenders have been devised consisting of hollow bodies, made of a flexible material such as rubber, to be inflated. It is well known, however, that inflation will produce ballooning and will, therefore, transform ordinary hollow bodies of flexible material into rounded and spherical shapes, fully unsuited for the purpose of automobile fenders from the standpoint of construction and appearance. If such pneumatic fenders are provided with very heavy walls and inflated by very low pressure, the essential resiliency of compressed air is absent and the fenders will act chiefly by the elasticity of their heavy walls, providing only an expensive and heavy but relatively ineffective protection.

It is my invention, as described in the aforesaid applications, to construct pneumatic cushions in the shape of protruding fenders; forming integral, detachable parts of the car; supported by the body of the car and by special brackets; the cushions consisting of relatively thin outercasings composed of rubber and optional inextensible enforcements, such as fabric or wire, or both; each carrying an innertube filled with air under pressure; casings, innertubes and supports embodying constructions to minimize ballooning when inflating the fenders to firm, definitely shaped, resilient, protectors, which term includes pneumatic fenders acting at the same time as bumpers by their protruding outer poles respectively as resilient bases for bumper rods attached to these poles.

It is my present invention to provide additional and simplified means for holding my pneumatic protectors in shape when inflated by any pressure; to provide a pneumatic fender in which the inflating pressure is primarily carried by inextensible septums and by the short free surfaces of the sections composing an inextensible innertube aggregate; and to provide detachable economical and effective pneumatic fenders or protectors, which can be constructed in any shape or form, will absorb shocks from all sides, protecting car and occupants as well as outside objects and will, without ballooning or deformation on inflation, rather add to the appearance of the car.

With the foregoing objects outlined and with other objects in view which will appear as the description proceeds, the invention consists in the novel features hereinafter described in detail, illustrated in the accompanying drawings, and more particularly pointed out in the appended claims.

In the drawings: Figure 1 is a plan view of an automobile applied with fenders according to my construction, in which parts of three fenders are illustrated broken away to visualize details, while the body of the car is shown only in its outline.

Figure 2 is a horizontal sectional view of the right rear fender seen from below on line 2—2 of Figure 3.

Figure 3 is a lateral view of the right rear fender in which a part has been broken away to show the supporting metallic structures and in which dotted lines indicate the projection of the septums of the innertube.

Figure 4 is a frontal view of the right fender with the headlight and part of the radiator.

Figure 5 is a lateral view of the arched metal support and the other metallic supporting structures of the right front fender, the outline of the fender being shown in an interrupted line.

Figure 6 is a vertical sectional view of the innertube aggregate for the right front fender, on a line just outside of and parallel to the outer border of the arched metal support.

Figure 7 is a horizontal sectional view on line 7—7 of Figure 5, seen from above.

Figure 8 illustrates on an enlarged scale a vertical section of the right front fender on the line 8—8 of Figure 1, seen from the front.

In Figure 1, 20 is the frame or body of an automobile, of which 21 is the left front fender, constructed according to my invention. This fender has two decorative embossed strips 22 and 23, made of rubber or related material and inlaid into the casing 21. 24 is the left headlight securely held in place, mounted on a triangular bracket forming part of the casing, similar to the corresponding right bracket 25. The air inlet 26 leads to the left innertube aggregate housed within the casing 21 and is preferably connected to a central station where a common inlet to inflate all fenders at the same time and a pressure indicating device is located.

27 is the left rear fender, of which part is broken away to expose the wheel 28 and the supporting structures of the fender. Fenders or protectors according to my invention consist of a casing and an innertube. The casing is formed by a flexible portion of a material such as known in casings for automobile tires having a large window which is secured to the body or frame of the automobile and to added supports, the metallic structures securely connected to and forming an extension of the rubber parts, and both together forming an all enclosed cavity harboring the innertube.

In Figure 1, the flexible surfaces of the fender 27 face the outside while the metallic extensions and supports are inside of the plane of the outer surface of the wheel 28. 29 is a metallic arch and the holes such as 30 serve for securing the window of the casing to the arch. The arch itself is attached to the body 20 of the car by screws such as 31. 32 is a horizontal bracket attached to the anterior leg of the arch 29 and also to the body 20 of the car by the screw 33, while it holds the window of the casing of the fender 27 by the hole 34 through means of a screw or bolt. 35 represents the corresponding posterior bracket, held by screws such as 36 to the body of the car and holding the casing by attachment to holes such as 37.

The right and the left fenders made according to my invention are identical except for inversion such as an object and its mirror image. The Figures 2 and 3, representing the right rear fender, may serve, therefore, to further illustrate the construction of the fender casing inclusive its supports and extensions. In Figure 3, 38 is the support arch and attached to the car by screws such as 39, which take hold of a semicircular band 40 which is welded in a right angle to the inner border of the arch 38 is also seen in Figure 2. The front bracket 41 is attached to the body by the screw 42 and the rear bracket 43, by the screws such as 44. The three brackets 38, 41 and 43 form together a portion of the inner half of the casing for the right rear fender 45, which is securely anchored to the metal by screws of which the screws such as 46, Figure 2, represents these securing parts of the window of the fender 45 to the arch 38. In Figure 2, 47 designates the casing of the freely protruding rear pole of the fender 45, 48 the arched portion of the casing attached to the metal arch 38 by screws such as 46 and provided with a bead 49, and 50 the casing of the anterior pole of the fender. It can easily be seen from Figure 1, that the inner side of the casing 47, 48, 49 and 50 is formed by the metal of the car body 20, to which the window of the casing is secured by screws such as 51 and 52. In similar manner a portion of the lower surfaces of the casing is formed by the arch and its two adjoining brackets as best seen in Figure 1 for the fender 27 and its supporting metallic extensions 29, 32 and 35.

The construction of the front fenders is similar. The arched support 53 of the right front fender 54, Figure 1, is preferably wider, however, following the shape of the car body, and is attached to the body of the car by screws such as 55, by means of the curved band 56, Figure 5, welded to the inner line of the arch 53. A posterior bracket 57 is secured to the body 20 of the car by screws such as 58 holding the rectangular edge 59 of the bracket 57, Figure 5.

The casing for the fender 54 may be fastened to the posterior bracket 57, the arch 53 and directly to the body 20 of the car, similar as described for the casing of the rear fender. In the Figures 1, 4 and 5, I illustrate a modification, whereby a triangular bracket 25 is made a part of the structure of the casing as shown in detail in Figure 8. In this figure, 60 is the rectangular edge of the bracket 25 which is attached by the screw 61 to the body 20 of the car. This attachment secures at the same time the end 62 of the casing. The adjoining part 63 of the casing follows closely the shape of the bracket 25 and is preferably secured to the same by rivets or vulcanization. To still secure a better coherence between the free edge of the bracket 25 and the ascending part 64 of the casing I prefer to fasten the strip 65 to the lower side of casing part 64 and to bracket 25. The strip 65 may be part of the casing 64 or may be a separate strip and is best riveted or vulcanized into place with the effect that the free end of the bracket 25 is held and enveloped by rubber from both sides and is, in this manner, made a rigid, integral part of the casing. This construction includes also the modifications of attaching the window edge of the casing directly to the free end of the bracket 25.

Figure 5 shows clearly that the bracket, made part of the casing as described before, permits a pleasing shape of the fender 54 with flat surfaces and hollow angular surfaces. In addition, the bracket 25 provides a base for placing the headlight 66, supported here fully independent of the presence of inflation and yet fully protected since the triangle of the bracket 25 is within non-compressible bounds. In Figure 4 67 is the right front wheel and 68 and 69 decorative inlays of the casing of the fender, corresponding to the inlays 22 and 23 of the left protector 21.

In Figures 7 and 8, 70 represents a bracket which closes the non-compressible space 71 between the lower surface of the triangular bracket 25 and the upper surface of the arch 53 to which the bracket 70 is attached by means of screws such as 72 taking hold of the rectangular edge 73 of the bracket 70. The free edge of the bracket 70 extends so close to the lower surfaces of the bracket 25 as to prevent the innertube from slipping into the space 71, but leaves room for enforcements such as 65. The bracket 70 fences the space between arch 53 and triangle 25 by following closely the outline of the latter, as indicated by an interrupted line in Figure 1. Seen from the side as in Figure 5, the fence bracket 70 is wider on top and more narrow on its base, where it is connected to the arch 53.

The Figures 1 and 5 illustrate the attachments for the casing of the right front fender. In Figure 1, 77 represents holes for attachments to the rear bracket 57; 78 is lateral edge of the arch 53; and the heads of bolts such as 79 represent attachments to the front of the arch 53. The body 20 serves for attachment by the holes 80 and 81, Figure 5, while the intervening portion of the casing is held by the bracket 25 as described in Figure 8. In this way the whole circumference of the edge of the casing window is held, when the screws, passed through the holes enumerated, take hold of a continuous, although segmented metallic bead of the casing or of continuous plates as 76, Figure 8, which are shaped to follow closely the surface of the metallic supports and may also be segmented. My construction as described permits easy detachment of the casing and also of the metallic brackets, while the large window allows to insert bulky innertube aggregates. In Figure 8, 82 represents the carcass or body layer of the casing showing the embedded wire cable netting 83. To eliminate vulcanization, my fender casings may also be molded, using fibrous materials and flexible plastics, such as cotton impregnated by flexible cellulose acetate or by polyvinyl acetal resins. 68 and 69 are embossed inlaid strips forming part of the top of the casing and 85 represents similar strips on the side. These serve also for practical purposes shaped as shown or deeper and made from tough rubber, to protect the casing proper against injuries incurred frequently on the sides of the fender when passing through garage doors, etc. 86 and 87 represent not raised inlays, decorative by their color and outline.

The freely protruding outer poles of the fenders or protectors may serve as bumpers, as shown for the fenders 21 and 54 of Figure 1. My invention includes, however, to use the fenders as bases for optionally added metallic bumpers as illustrated for the rear protectors. The metallic bumper 88 is added to the fenders 27 and 45. As an attachment, I may rivet or vulcanize the fender to a piece of rubber and cement or vulcanize the same to the fender. In Figure 1, the bumper 88 consists of the customary, slightly curved, vertical steelband which is bent, however, on its ends 89 to contact the fenders 27 and 45. A horizontal, strong and heavy sheet of steel 90 is welded to the inside of the bumper as an enforcement. 91 is a vertical, flat wide steel spring which, when bent in a U or S shape and attached to the bumper part 90 and the car 20, serves to hold the bumper in place without attachment to the fenders, which may be aided by hinged arms or by sustaining brackets.

I prefer wheels of such shape that will not show unnecessary protruding metal parts. In Figure 1, the right rear wheel is shown, exposed by breaking away the superlying structures, and in horizontal sectional view, in which 94 is the crosssection of the tire. 95 is the felly or base on which the tire rests, from which the spokes disc 96 of the wheel draws inward as a hollow cup, which on its basis is attached to the end plate 97 of the axle 98 by screws such as 99.

The Figures 2 and 3 show the construction of the inner tube for the rear fender and Figures 6, 7 and 8 the innertube of the front fender, both constructed according to the same basic principle, employing an inextensible innertube, which contains at least one septum of inextensible material arranged in a plane likely to balloon while the outside of the innertube is made of such size and shape as to fit snugly into the inside of the casing. The cavity of the innertube is subdivided by the septums into an aggregate of sections which permit, by means of a hole perforating each septum, however, free communication of the inflating air pressure, throughout the innertube while the innertube as a whole is airtight towards the outside, except for an inlet for the inflating tube or valve.

In Figures 2 and 3 the innertube aggregate consists of the four rear segments 113, 114, 115 and 116 which are joined together and two arched sections 117 and 118. All cavities are in communication by perforations such as 119. The free surfaces of the last two cavities, 113 and 114, are shown flat while the sections 115 and 116 are illustrated as slightly rounded on their outer surfaces merely showing that the innertube is not yet fully inflated to size. I have found that slight curvatures arranged in series as the rounded surfaces of the sections 115, 116 and 117 and 118, will stretch on inflation similar as the belly of an accordion when stretched, and will pull in a directed expansion the outer segments outward whereby the increased tension of the inextensible casing will tend to fully flatten the free surfaces of the segments.

Figure 3 shows in interrupted lines the projection of the sections of the right rear innertube, arranged as the figures indicate.

Figure 6 illustrates, in vertical sectional view, the innertube for the right front fender, consisting of a cavity held in shape by eleven septums of which 121 is one, while the free surfaces are flat and their connection with the septums shows varying minor degrees of enforcements of either the base of the septum such as 122 or of outer corners and borders such as the inlay 123 and 124. The communicating holes are not shown.

In Figure 8, representing a cross section through the right front fender, as indicated in Figure 1, 126 represents the wall of the innertube segment illustrated. This wall may optionally be of increased thickness as shown, to fill out the hollowness of the bead 127 and to round its rear corner 128, or on other places found to cause bulging. 129 represents an optional added elastic lining of live rubber added to the innertube 126 to increase air tightness in case the inextensible innertube aggregate should develop cracks.

The holes such as 119, Figure 2, connecting the sections of the pneumatic bodies to enable simultaneous inflation of the whole aggregate, serve at the same time to equalize in a collision the air pressure throughout all four fenders. I have found that small holes of approximately ¼" diameter or less are sufficient for such purposes. I, furthermore, experienced, that the inflating pressure may be reduced without disadvantage if the holes are selected ⅛" of diameter or smaller which effects that the propagation of sudden compression waves is somewhat hindered and delayed, or if the holes are supplied with plain valves, such as plain cone and ball valves, which offer resistance to a wave of suddenly increased pressure caused by external shocks but will serve to permit equalization of pressure in time. In such construction, the air in the sections affected directly by the external compressing force will offer increasing resistance with increasing degree of compressions which will act upon the air enclosed in the affected sections only and not, as in a fender provided with freely communicating holes, compress the greatly larger amount of air contained in one whole fender or even in all four fenders. For the purpose of lowering the air pressure needded for inflation of the fenders, every section of the innertube may also be separately provided with individual valves, to be inflated individually with the same or different degree of pressure or to be connected to a pipeline leading to a central inflating station. For the other extreme, of employing all four fender cavities to absorb waves of compression, I connect all fenders by a common pipeline leading to one valve only, serving a central station, connecting all fenders equally, and without hindrance, except for optional shutoff valves preferably included in each line to enable a separate shutoff of each fender to test for leaks.

The degree of pressure, with which I prefer to inflate the pneumatic bodies described before, depends upon the size of the holes, the hookup of the valves, the requirement of resistance to compression, etc. Generally spoken, I employ pressures related in the amount of lbs. of pressure per square inch, to the pressures used in tires, or frequently less as especially in fenders containing separating valves or small holes, where pressures of approximately 10 lbs. per square inch may be sufficient. In any case, the pressure required should inflate the pneumatic structures to firm, not flabby, bodies of such resistance as required to encounter the shocks to be expected but not exceeding the figure which will safely exclude bursting of the inextensible walls.

It is a basic and essential part of my invention to construct the inextensible innertube aggregate of such size and form that it will fit snugly into the inside of the casing. To be exact, the outside of the innertube, when inflated under the same conditions as when encased, should conform to the inside of the casing after the same has been brought to the degree of tension desired in the inflated fender. In practice, I found it sufficient to construct the outside of the innertube of such shape and form that it will fit snugly into the inside of the casing. The inflation will expand and stretch somewhat the innertube and effect the desired degree of tension of the casing.

If the innertube is selected too small, it will not suffice to fill out the casing and the latter will be flabby even after the innertube aggregate has been inflated fully. An innertube which is too large will be capable of applying tension to the casing on inflation, but will permit bulging and ballooning of the casing to some degree, since the sections will be restricted and will tend to expand most in those planes meeting the least resistance. Only an innertube aggregate of correct size and fitting will exclude ballooning and bulging and will, at the same time, provide the casing with tension.

All innertube aggregates, that is innertubes provided at least with one cross member holding two opposing surfaces, likely to balloon, together in a fixed distance, are, according to my invention, constructed throughout, with the possible exemption of an elastic inner lining, from inextensible materials or combinations such as filled rubber, rubber and fibers such as cotton, reclaimed rubber, flexible plastics, wires, wire cloth or wire cables and other substances of non-extensible qualities. Such aggregates, inflated by themselves or within a casing, show a great difference as compared with the elastic innertubes well known from tires, footballs, etc. An extensible innertube, inflated without casing will grow in size, and tend to assume more and more a tubular or spherical shape, until it finally will burst on continued inflation. An elastic innertube, inflated within a casing, will follow the plane of least resistance and will tend to balloon the casing into a rounded shape, at the same time effecting an increasing strain upon the casing and the parts where it is held. An elastic innertube even when provided with septums, for instance, as illustrated in Figure 6, will produce bulging of the casing when inflated to a degree which will overcome the elastic coherence of the material. Only an inextensible innertube, properly constructed as described, and of fitting size and shape, will prevent ballooning, permitting construction of pneumatic, pressure inflated protectors of definite shape. The pneumatic bodies described, using inextensible septums, offer in regard to construction, in addition the great advantage, that the septums carry the greater part of the pressure, relieving the casing, permitting to construct the casing of relatively thin and inexpensive material.

An intermediate, not fully inflated condition is illustrated in Figure 2, where the free surfaces of section 116 are still capable to stretch while most other sections are fully stretched and flattened. A further aid to directed expansion represents a construction which utilizes such number of septums, respectively sections, that the free surfaces are shorter than the length of the septums. In addition, an overrounding of the free surface of a section, more than would correspond to a section of a circle of the required radius, or added folds will tend to direct expansion comparable to the bellows of an accordion inflated by air. The free surfaces of the sections will be flattened if the directed expansion is stronger than the bulging forces respectively if the casing overcomes by flattening pull the natural bulging of the sections.

By the afore described means, I made it possible to construct novel pneumatic pressure inflated bodies of smooth surfaces that will not change shape on inflation, applicable to novel uses as especially for providing pneumatic automobile fenders, which can be incorporated in any desired shape or size into the construction of automobiles and will, while not deducting in any way from their modern streamlined appearance, greatly add to the safety of the car reducing at the same time expenses for repairs.

While I have disclosed what I now consider to be some preferred embodiments of the invention in such manner that they may be readily understood, it is manifest that changes may be made in the details disclosed without departing from the spirit of the invention as expressed in the claims.

I claim:

1. A pneumatic fender construction for automobiles comprising a non-symmetrical outer casing formed of relatively inextensible flexible material, and an inner tube aggregate conforming to the contour of the casing and having a plurality of individual chambers separated by relatively inextensible flexible septums, said septums having openings therethrough to permit only a delayed transfer of air from one chamber to an adjacent chamber when a portion of the fender is deformed by impact with an object, whereby the pressure in no portion of the inner tube aggregate is lowered when the fender is deformed by impact with an object.

2. A pneumatic fender construction for automobiles comprising a non-symmetrical outer casing formed of relatively inextensible flexible material, and an inner tube aggregate conforming to the contour of the casing and having a plurality of individual chambers separated by relatively inextensible flexible septums, said septums extending completely across from one wall of the inner tube aggregate to the other wall thereof, said septums having openings therethrough to permit only a delayed transfer of air from one chamber to an adjacent chamber when a portion of the fender is deformed by impact with an object, whereby the pressure in no portion of the inner tube aggregate is lowered when the fender is deformed by impact with an object.

3. A pneumatic fender construction for automobiles comprising a non-symmetrical outer casing formed of relatively inextensible flexible material, and an inner tube aggregate conforming to the contour of the casing and having a plurality of individual chambers separated by relatively inextensible flexible septums, each septum extending transversely of the inner tube aggregate and being of relatively small extent as compared with the length of the fender to thereby insure a definite localized, relatively small chamber to resist a localized blow against the fender, said septums having openings therethrough to permit only a delayed transfer of air from one chamber to an adjacent chamber when a portion of the fender is deformed by impact with an object, whereby the pressure in no portion of the inner tube aggregate is lowered when the fender is deformed by impact with an object.

4. A pneumatic fender construction for automobiles comprising a non-symmetrical outer casing formed of relatively inextensible flexible material, and an inner tube aggregate conforming to the contour of the casing and having a plurality of individual chambers separated by relatively inextensible flexible septums, said septums extending transversely across the inner tube aggregate and preventing ballooning of said inner tube aggregate, said septums having openings therethrough to permit only a delayed transfer of air from one chamber to an adjacent chamber when a portion of the fender is deformed by impact with an object, whereby the pressure in no portion of the inner tube aggregate is lowered when the fender is deformed by impact with an object.

CLAUSS BURKART STRAUCH.